(12) United States Patent
Perez et al.

(10) Patent No.: US 11,478,707 B2
(45) Date of Patent: Oct. 25, 2022

(54) GAP JUMPING SIMULATION OF STRETCHABLE CHARACTER IN COMPUTER GAME

(71) Applicant: Square Enix Ltd., London (GB)

(72) Inventors: Stephen Perez, Union City, CA (US); Noriyuki Imamura, Yokohama (JP); Gary Linn Snethen, Fremont, CA (US)

(73) Assignee: SQUARE ENIX LTD., London (GB)

( * ) Notice: Subject to any disclaimer, the term of this patent is extended or adjusted under 35 U.S.C. 154(b) by 143 days.

(21) Appl. No.: 17/115,625

(22) Filed: Dec. 8, 2020

(65) Prior Publication Data

US 2021/0236932 A1 Aug. 5, 2021

Related U.S. Application Data

(63) Continuation-in-part of application No. 16/915,732, filed on Jun. 29, 2020, now Pat. No. 11,052,317.

(30) Foreign Application Priority Data

Jan. 30, 2020 (JP) .............................. JP2020-013747

(51) Int. Cl.
*A63F 13/56* (2014.01)
*G06T 13/80* (2011.01)

(52) U.S. Cl.
CPC .............. *A63F 13/56* (2014.09); *G06T 13/80* (2013.01); *A63F 2300/6607* (2013.01)

(58) Field of Classification Search
CPC .......... A63F 13/55; A63F 13/56; A63F 13/57; A63F 2300/64; A63F 2300/65;

(Continued)

(56) References Cited

U.S. PATENT DOCUMENTS 6,088,042 A * 7/2000 Handelman ............. G06T 13/40
345/475
6,191,798 B1 * 2/2001 Handelman ............. G06T 13/40
345/475

(Continued)

FOREIGN PATENT DOCUMENTS

JP 2000153062 A 6/2000
JP 2010088641 A 4/2010

OTHER PUBLICATIONS

Ishii, R. "Announced Participation in Ms. Marvel as one of the Main Characters of 'Marvel's Avengers.' A Muslim Girl with Stretched Limbs is the Key to the Reunion of The Avengers." Automation-Media.com, Oct. 7, 2019, 8 pages, [Online] [Retrieved Mar. 21, 2022], Retrieved from the Internet <URL:https://automaton-media.com/articles/newsjp/20191007-103368/>.

(Continued)

*Primary Examiner* — Allen Chan
(74) *Attorney, Agent, or Firm* — Fenwick & West LLP (57) ABSTRACT

Embodiments relate to generating image frames including a motion of a character with one or more stretchable body parts by either performing only blending of prestored animation clips or performing both the blending of prestored animation clips and performing inverse kinematics operations where one or more bones in the body parts are stretched or contracted. Choosing whether to perform blending or the inverse kinematics depends on whether predetermined conditions are satisfied or not. Prestored animation clips to be blended may be determined according to the speed of the character when performing the jumping motion. When performing the inverse kinematics, physical properties of the character are simulated to determine the trajectory of the character during the jumping.

20 Claims, 9 Drawing Sheets (58) Field of Classification Search
CPC .......... A63F 2300/66; A63F 2300/6607; A63F 2300/6615; A63F 2300/6623; G06T 13/80
USPC .......................................................... 463/31
See application file for complete search history.

(56) References Cited

U.S. PATENT DOCUMENTS

| | | | |
|---|---|---|---|
| 6,626,759 | B1 | 9/2003 | Matsuoka |
| 7,088,366 | B2 | 8/2006 | Okubo |
| 7,173,625 | B2 * | 2/2007 | Nam .................. G06T 13/40 345/473 |
| 8,216,066 | B2 | 7/2012 | Tsunashima et al. |
| 8,648,864 | B2 * | 2/2014 | Wrinch .................. G06T 13/40 345/473 |
| 8,696,451 | B2 | 4/2014 | Nimura et al. |
| 9,056,247 | B2 | 6/2015 | Glassenberg et al. |
| 9,177,409 | B2 | 11/2015 | Rennuit et al. |
| 2011/0267356 | A1 | 11/2011 | Rennuit |

OTHER PUBLICATIONS

Nintendo. "Great confpelle Dorthes SPECIAL." Kadokawa, vol. 19, No. 2, Feb. 2019, pp. 19, (with concise explanation of relevance).
Team SMAB. "Super Smash Bros." Melee, Shin White, Inc., vol. 16, No. 51, Dec. 21, 2001, pp. 132-133, (with concise explanation of relevance).
The Japan Patent Office, Office Action, Japanese Patent Application No. 2021-012578, dated Feb. 28, 2022, 12 pages.

\* cited by examiner

GAP JUMPING SIMULATION OF STRETCHABLE CHARACTER IN COMPUTER GAME

CROSS-REFERENCE TO RELATED APPLICATIONS

This application is a continuation-in-part application of U.S. patent application Ser. No. 16/915,732, filed on Jun. 29, 2020; and claims priority to Japanese Patent Application No. 2020-013747 filed on Jan. 30, 2020, which are incorporated by reference herein in their entirety.

BACKGROUND

The present disclosure relates to simulating a jumping motion of a character having stretchable body parts in a computer game.

In computer games, various characters may take actions and make motions in simulated environment. Many video games include characters that interact with environment upon which the video game takes place. Various schemes are adopted to render the characters in the video game more realistic and in real-time. A character is generally defined by a skeleton including bones that are connected by articulate joints arranged in a tree data structure. Inverse kinematics is performed using such skeleton to generate a series of poses of characters so that the limbs of characters align with the virtual environment of the video game. Each of the pose may be defined in terms of properties of joints, for example, including translational movements and rotational movements of the joints. Depending on the action to be taken by each character, inverse kinematics determines the orientations of joints so that a series of poses may transition in a smooth and realistic manner. The poses of the character may then be processed into a set of polygons with vertices that form a surface of the character.

Another way of generating character motions in video games is by blending animation clips. The animation clips are generated in advance and stored in the gaming system. A temporal sequence of clips is selected, and then the selected animation clips may be blended according to time-varying weights to produce new motions.

Although using inverse kinematics to simulate movements of the joints may provide more realistic motions and poses, more computational resources are used to render the characters compared to blending of the animation clips because the poses of the characters are determined in real time instead of retrieving prestored animation clips.

SUMMARY

Embodiments relate to simulating a jumping motion of a character in a computer game. When predetermined conditions are satisfied, a first series of image frames including a first jumping motion of the character over the gap is generated based on prestored animation data of the character without performing inverse kinematics that simulate stretching of at least one bone in a limb of the character. When the predetermined conditions are not satisfied, a second series of image frames including a second jumping motion of the character over the gap is generated by at least performing the inverse kinematics that simulate stretching of at least one bone in a limb of the character.

In one or more embodiments, the predetermined conditions are associated with one or more of (i) a distance to the opposite side of the gap from a point of initiating the jumping, (ii) a height difference at both sides of the gap, and (iii) a speed of the character when the character is performing the jumping.

In one or more embodiments, satisfying the predetermined conditions indicates that the character reaches an opposite side of the gap without stretching one or more limbs of the character.

In one or more embodiments, performing the inverse kinematics includes determining a pose of the character by changing a length of at least one bone in the limb of the character.

In one or more embodiments, poses of the character and a trajectory of the character during the jumping motion are determined by simulating motions of the character according to physical properties of the character including at least one of a position, linear velocity, angular velocity, mass, inertia tensor and orientation of the character.

In one or more embodiments, the character's hand attaches to a location during the jumping motion before landing on the other side of the gap, and the simulating the motions of the characters is further based on a force applied to the character by the attached object and the inverse kinematics.

In one or more embodiments, the location is determined based on one or more markers in a simulated environment when a user command indicating a grabbing or jumping action is received.

In one or more embodiments, the first series of image frames are generated by blending a subset of prestored animation clips of the character.

In one or more embodiments, the subset of prestored animation clips is selected based on the speed of the character when the character is performing the jumping motion.

In one or more embodiments, a command is received from a user to initiate the jumping before generating the first series of image frames or the second series of image frames.

In one or more embodiments, the first series of image frames include the character grabbing a wall or a ledge at the other side of the gap using both arms of the character, and wherein the second series of image frames include the character grabbing an object placed between the one side of the gap and the other side of the gap using a single arm or grabbing the wall or the ledge at the other side of the gap using the single arm.

The figures depict various embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

In the following description of embodiments, numerous specific details are set forth in order to provide more thorough understanding. However, note that the embodiments may be practiced without one or more of these specific details. In other instances, well-known features have not been described in detail to avoid unnecessarily complicating the description.

Embodiments are described herein with reference to the figures where like reference numbers indicate identical or functionally similar elements. Also in the figures, the left most digit or digits of each reference number correspond to the figure in which the reference number is first used.

Embodiments relate to generating image frames including a jumping motion of a character with one or more stretchable body parts by either performing only blending of prestored animation clips or performing, in addition to, the blending of the prestored animation clips together with inverse kinematics operations where one or more bones in the body parts are stretched or contracted. Whether to perform only blending or the additional inverse kinematics depends on whether predetermined conditions are satisfied or not. Prestored animation clips to be blended may be determined according to the speed of the character when performing the jumping motion. When performing the inverse kinematics, physical properties of the character are simulated to determine the trajectory of the character during the jumping.

Among other advantages, embodiments enable efficient generation of image frames including jumping of a character with one or more stretchable body parts over a gap that is both efficient while providing realistic image frames. By only blending animation clips, the jumping motion of the character may be generated with the efficient use of computing resources (e.g., processor cycles and memory space). However, in certain conditions where the blending of animation clips by itself does not result in motions that are realistic or as desired by a game developer, the character poses in the images are further determined by inverse kinematics that consume more computing resources compared to the blending of animation clips.

Figure 1:
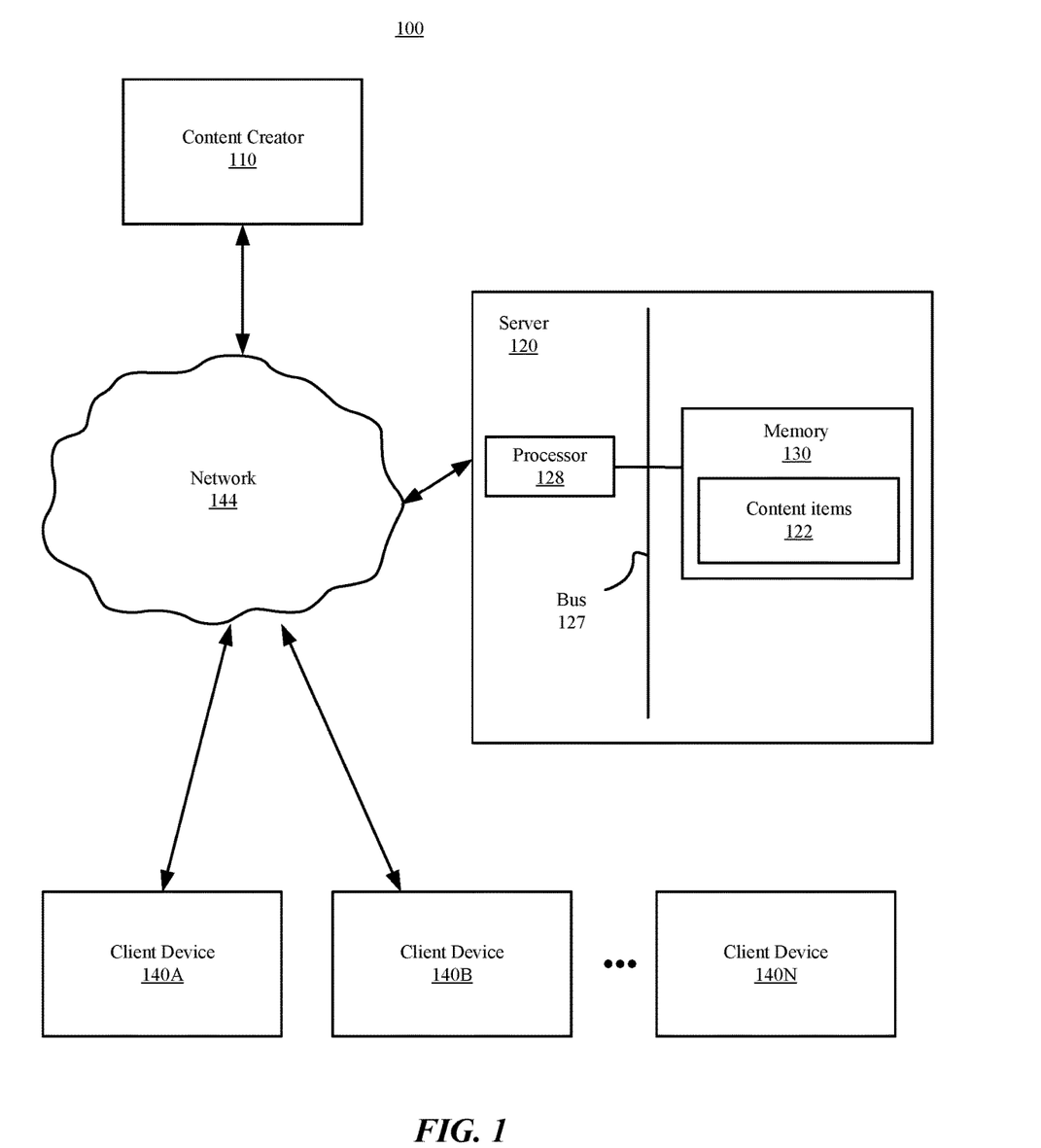
FIG. 1 is a block diagram of a computer game system, according to an embodiment.

FIG. 1 is a block diagram of a system 100 in which the techniques described herein may be practiced, according to an embodiment. The system 100 includes, among other components, a content creator 110, a server 120, client devices 140, and a network 144. In other embodiments, the system 100 may include additional content creators 110 or servers 120, or may include a singular client device 140.

The content creator 110, the server 120, and the client devices 140 are configured to communicate via the network 144. The network 144 includes any combination of local area and/or wide area networks, using both wired and/or wireless communication systems. In one embodiment, the network 144 uses standard communications technologies and/or protocols. For example, the network 144 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 144 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 144 may be represented using any suitable format, such as hypertext markup language (HTML) or extensible markup language (XML). In some embodiments, all or some of the communication links of the network 144 may be encrypted using any suitable technique or techniques.

The content creator 110 is a computing device, such as a personal computer, a mobile phone, a tablet, or so on, which enables a game developer to create content items (e.g., characters and environment information) for a computer game. For this purpose, the content creator 110 includes a processor and a memory (not shown) that stores various software modules for creating content items. The created content items are sent to the server 120 for storing on its memory 130.

The server 120 is a computing device that includes a processor 128 and a memory 130 connected by a bus 127. The memory 130 includes various executable code modules or non-executable content items 122. The server 120 may receive and route messages between the content creator 110 and the client devices 140. The non-executable content items 122 may include information on characters with stretchable body parts. Such content items may be sent to the client devices 140 via the network 144.

The processor 128 is capable of executing instructions, sequential or otherwise, that specify operations to be taken, such as performance of some or all of the techniques described herein. The bus 127 connects the processor 128 to the memory 130, enabling data transfer from the one to the other and vice versa. Depending upon the embodiments, the server 120 may include additional elements conventional to computing devices.

Each client device 140 is a computing device that includes a game or other software. The client device 140 receives data objects from the server 120 and uses the data objects to render graphical representations of characters and environment in which the characters take actions in the game. Different client devices 140 can request different data objects from the server 120.

Although the embodiment of FIG. 1 is described as operating in a networked environment, in other embodiments, the client devices 140 are not connected via network and the computer game is executed without exchanging messages or content items over any network. In such cases, any content items associated with the compute game may be received and installed on the client devices 140 using a non-transitory computer readable medium such as DVD ROM, CD ROM or flash drive.

Figure 2:
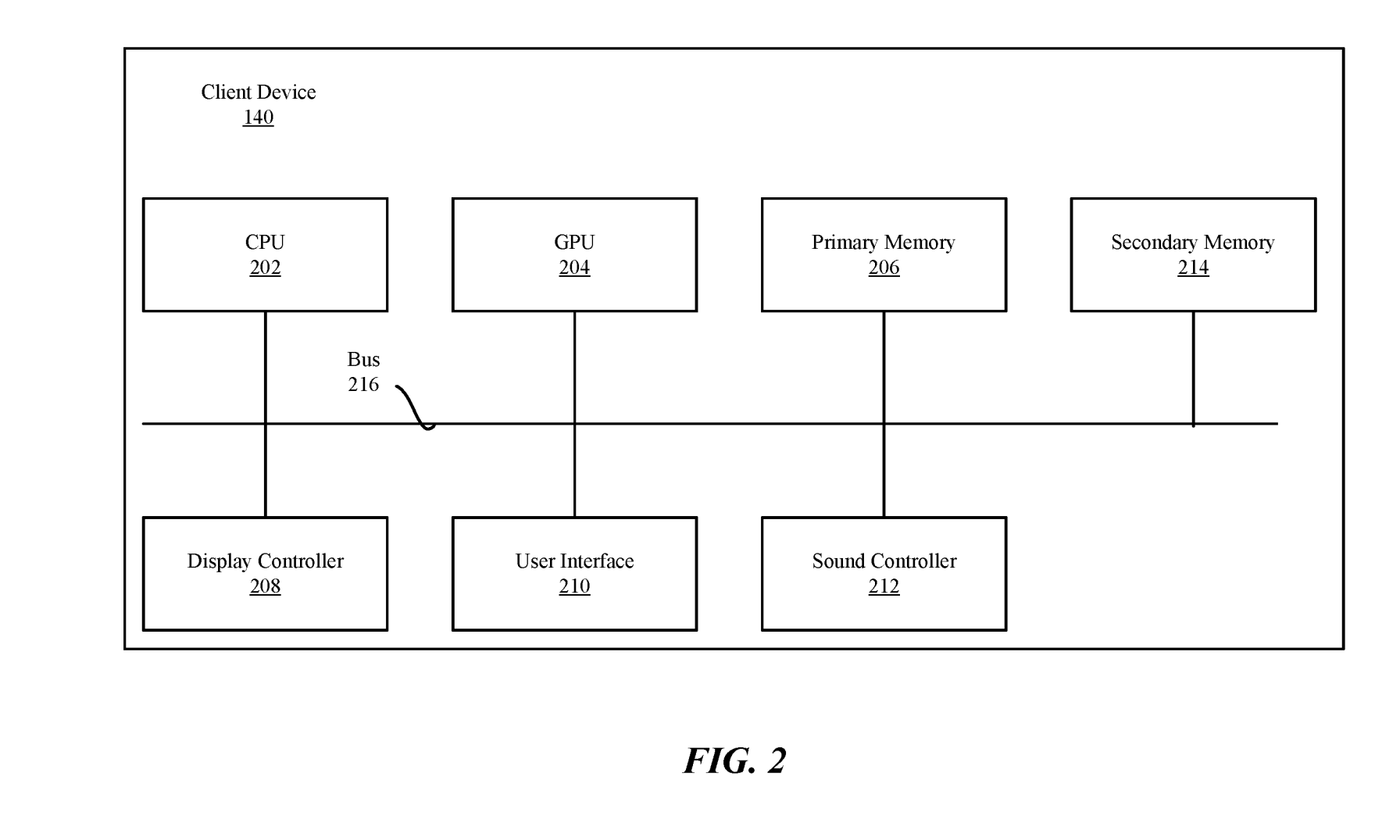
FIG. 2 is a block diagram of the client device of FIG. 1, according to an embodiment.

FIG. 2 is a block diagram of the client device 140 of FIG. 1, according to an embodiment. Depending upon the embodiment, the content creator 110 and/or server 120 may be embodied as a computing device that includes some or all of the hardware and/or software elements of the client device 140 described herein. The client device 140, content creator 110, and/or server 120 are any machine capable of executing instructions, and may each be a standalone device or a connected (e.g. networked) set of devices.

The client device 140 may include, among other components, a central processing unit ("CPU") 202, a graphics processing unit ("GPU") 204, a primary memory 206, a secondary memory 214, a display controller 208, a user interface 210, and a sound controller 212 that are connected by a bus 216. While only a single client device 140 is illustrated, other embodiments may include any collection of client devices 140 that individually or jointly execute instructions to perform any one or more of the methodologies discussed herein.

The primary memory 206 is a machine-readable medium that stores instructions (e.g., software) embodying any one or more of the methodologies or functions described herein. For example, the primary memory 206 may store instructions that, when executed by the CPU 202, configure the CPU 202 to perform a process 700, described below in detail with reference to FIG. 7. Instructions may also reside, partially or completely, within the CPU 202 and/or GPU 204, e.g., within cache memory, during execution of the instructions.

The term "machine-readable medium" should be taken to include a single medium or multiple media (e.g., a centralized or distributed database, or associated caches and servers) able to store instructions. The term "machine-readable medium" shall also be taken to include any medium that is capable of storing instructions for execution by the device and that cause the device to perform any one or more of the methodologies disclosed herein. The term "machine-readable medium" includes, but is not limited to, data repositories in the form of solid-state memories, optical media, and magnetic media.

The secondary memory 214 is a memory separate from the primary memory 206. Similar to the primary memory 206, the secondary memory 214 is a machine-readable medium that stores instructions (e.g., software) embodying any one or more of the methodologies or functions described herein. For example, the primary memory 206 may be a hard drive of the client device 140, and the secondary memory 214 may be a game disc.

The CPU 202 is processing circuitry configured to carry out the instructions stored in the primary memory 206 and/or secondary memory 214. The CPU 202 may be a general-purpose or embedded processor using any of a variety of instruction set architectures (ISAs). Although a single CPU is illustrated in FIG. 2, the client device 140 may include multiple CPUs 202. In multiprocessor systems, each of the CPUs 202 may commonly, but not necessarily, implement the same ISA.

The GPU 204 is a processing circuit specifically designed for efficient processing of graphical images. The GPU 204 may render objects to be displayed into a frame buffer (e.g., one that includes pixel data for an entire frame) based on instructions from the CPU 202. The GPU 204 may include one or more graphics processors that may execute graphics software to perform a part or all of the graphics operations.

The display controller 208 is a circuit that generates a video signal using graphical data from the GPU 204. For example, the display controller 208 drives a display device (e.g., a liquid crystal display (LCD) and a projector). As such, a game, including one or more characters with stretchable body parts, can be displayed as images or a sequence of image frames through the display controller 208.

The sound controller 212 is a circuit that provides input and output of audio signals to and from the client device 140. For purposes of a character, the sound controller 212 can provide audio signals that align with actions and objects in the computer game.

The user interface 210 is hardware, software, firmware, or a combination thereof that enables a user to interact with the client device 140. The user interface 210 can include an alphanumeric input device (e.g., a keyboard) and a cursor control device (e.g., a mouse, a trackball, a joystick, a motion sensor, or other pointing instrument). For example, a user uses a keyboard and mouse to control a character's action within a game environment that includes an electronic map rendered by the client device 140.

The client device 140 executes computer program modules for providing functionality described herein. As used herein, the term "module" refers to computer program instructions and/or other logic used to provide the specified functionality. Thus, a module can be implemented in hardware, firmware, and/or software. In some embodiments, program modules formed of executable computer program instructions are loaded into the memory 206, and executed by the CPU 202 or the GPU 204. For example, program instructions for the process 700 describe herein can be loaded into the primary memory 206 and/or secondary memory 214, and executed by the CPU 202 and GPU 204. In some embodiment, one or more of the functionality of the modules described herein may be performed by dedicated circuitry.

Figure 3:
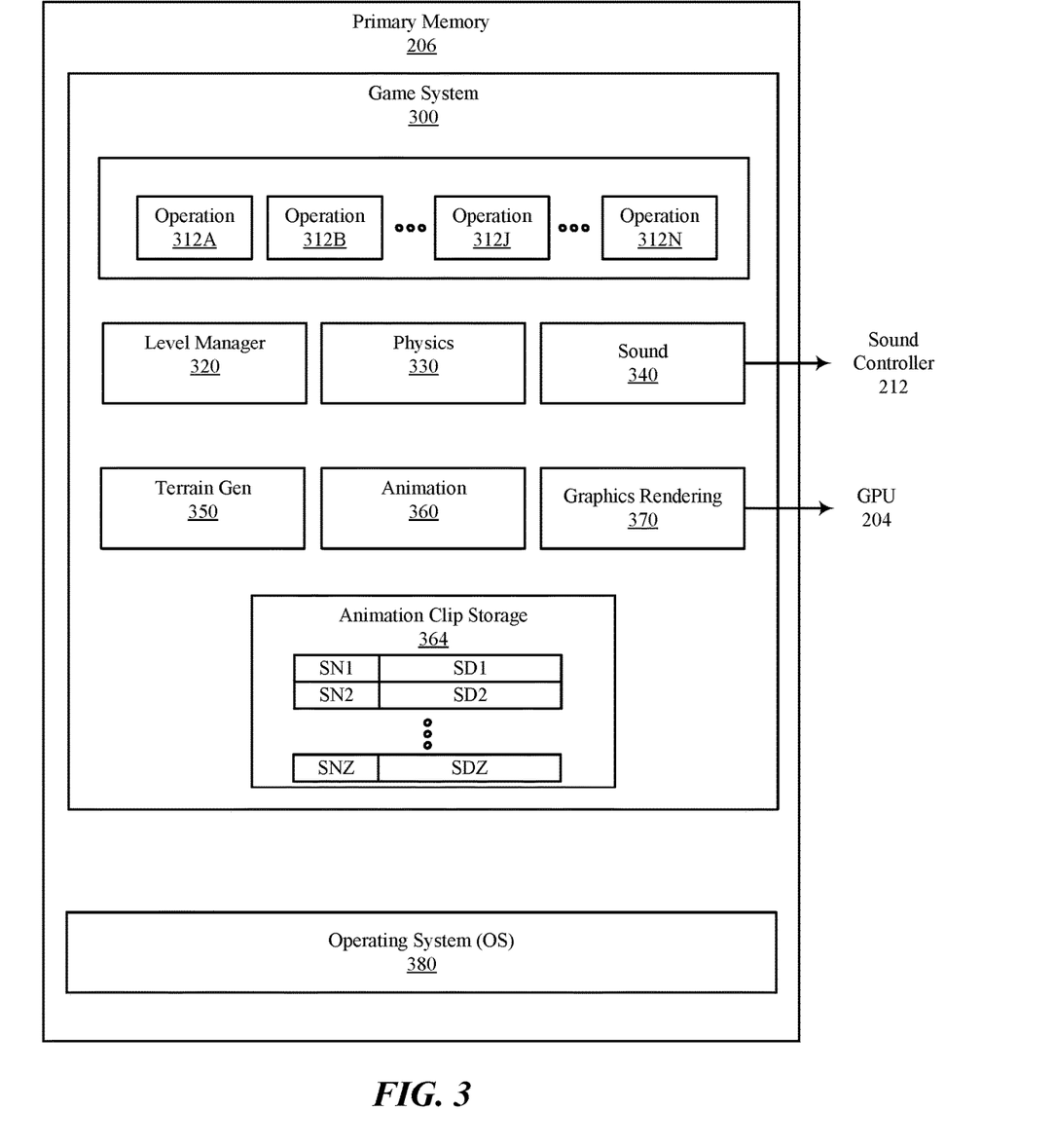
FIG. 3 is a block diagram of software modules in a memory of the client device of FIG. 1, according to an embodiment.

FIG. 3 is a block diagram of software modules in a primary memory of the client device 140 of FIG. 1, according to an embodiment. In particular, FIG. 3 illustrates software modules in the primary memory 206 of the client device 140. The primary memory 206 may store, among other modules, a game system 300 and an operating system ("OS") 380. The primary memory 206 may include other modules not illustrated in FIG. 3. Furthermore, in other embodiments, at least part of the modules in FIG. 3 is stored in secondary memory 214.

The game system 300 includes a level manager 320, a physics system 330, a sound module 340, a terrain generator 350, an animation module 360, and a graphics rendering module 370. These modules collectively form a "game engine" of the game system 300.

The game system 300 include operation modules 312A through 312N (collectively referred to as "operation modules 312") to generate actions of characters within game environment. At least some of the operation modules 312 prompt changes in poses of characters to realize actions. The operation modules 312 perform operations that change various parameters (e.g., poses or positions of a character) based upon occurring of certain events (e.g., user interactions, expirations of time, and triggers occurring in the game).

Some operation modules 312 are associated with actions taken by a character with stretchable body parts. Such character may have one or more body parts that are stretchable or contractable (e.g., elastic). The character may appear to have flexible bones that stretch or contract as the character takes actions (e.g., stretch arm to punch an opponent) or as the character becomes a subject of actions by other characters (e.g., receiving punch from an opponent). One of such operation modules 312 is operation module 312J that simulates jumping motions of the characters over a gap, as described below in detail with reference to FIG. 4.

The level manager 320 receives data objects from the server 120 and stores the level data in the primary memory 206. Other modules of the game system 300 can request one or more levels from the level manager 320, which responds to the requests by sending the level data corresponding to the requested level to the module of the game system 300 that sent the request.

The terrain generator 350 generates a complete electronic map based on electronic map data and game data. The terrain generator 350 receives electronic map data from the level manager 320, and game and object data from the content source stored, for example, in secondary memory 214.

The physics system 330 models and simulates the dynamics of objects in the game environment. In some embodiments, after an operation module 312 is invoked in the game system 300, the physics system 330 models how an action or event associated with the operation module 312 affects objects or characters associated with the operation 312. For example, the physics system models how a character should move when jumping a gap. Depending on the action and object, other objects and actions may become associated with the action or object.

The animation module 360 performs kinematic animation of objects based on the operations 312 from the game system 300. For example, if operation module 312J specifies that a character is to jump over a gap, the animation module 360 generates a series of character poses that collectively form a character's motion corresponding to jumping. For this purpose, the animation module 360 is capable of performing blending of animation clips and inverse kinematics operations. Some of these characters may have stretchable body parts with one or more bones that can be stretched or contracted during such motions. The details of the animation module 360 are described below with reference to FIG. 5.

The sound module 340 generates sounds corresponding to events and/or actions occurring in the game environment. For example, a corresponding sound may be generated when a character punches an opponent. Animation data from the animation module 360 or terrain information from the terrain generator 350 may be sent to the sound module 340 to enable the sound module 340 to produce appropriate sound data that is sent to the sound controller 212.

The graphics rendering module 370 renders graphics using information from the animation module 360 to generate image frames. For this purpose, the graphics rendering module 370 may receive transformation matrices that indicate changes in vertices of polygons that collectively form a surface of the characters, and terrain information from the terrain generator 350. The graphics rendering module 370 processes blended animation clips, the transformation matrices and the terrain information to generate graphical data that is sent to the GPU 204 for rendering images on a display screen (e.g., a display screen of the client device 140 or a display connected to the client device 140, via the display controller 208).

The OS 380 manages computer hardware and software resources. Specifically, the OS 380 acts as an intermediary between programs and the computer hardware. For example, the OS 380 can perform basic tasks, such as recognizing input from the user interface 210 and sending output to the display controller 208.

Animation clip storage 364 stores animation clips of one or more characters. The animation clips SD1 through SDZ with corresponding indices SN1 through SNZ may be retrieved and processed by the animation module 360 to generate motions of characters including, among others, a jumping motion of a character with stretchable body parts.

Figure 4:
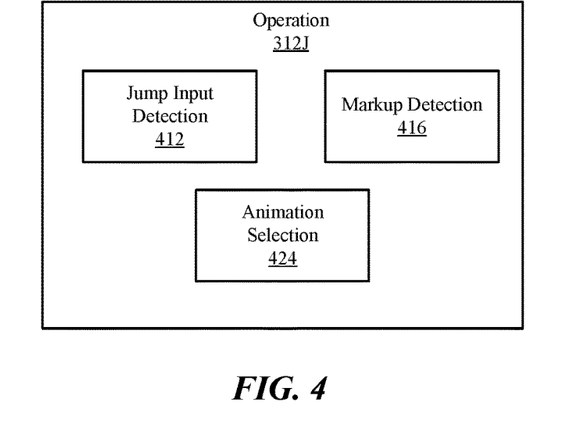
FIG. 4 is a block diagram of a jumping operation module in the memory of FIG. 3, according to an embodiment.

FIG. 4 is a block diagram of the operation module 312J for performing a jumping operation of a character with stretchable body parts. The operation module 312J may include, among others, jump input detection module 412, markup detection module 416, and animation selection module 424. Although these modules are illustrated as being separate code modules in FIG. 4, one or more of these modules may be combined into a single module or be split into more sub-modules.

The jump input detection module 412 detects whether a character controlled by a user should perform a jumping operation. For this purpose, jump input detection module 412 detects user input received via the user interface 210 indicating a jump motion (e.g., pressing of a button on game console controller). Depending on the stage, phase of the game or previous/subsequent user inputs, the same user input may indicate different actions of the character.

If the user input indicating the jump motion is detected, the markup detection module 416 that detects various points of interest in the virtual environment of a character. The virtual environment may be marked up with various objects and points of interest (e.g., ledges, edges, hurdles, etc.) Among other things, the markup detection module 416 determines whether a gap is present in the path of the character, and if so, determines the configuration (e.g., width and height difference) of the gap. In one or more embodiments, the gap may be indicated by markers that indicate various objects in the simulated environment. The markup detection module 416 may also send, to the animation selection module 424, information on the distance or height to a point (e.g., ledge) at the opposite side of the gap relative to the location where the character has initiated the jump, as determined by the jump input detection module 412.

The markup detection module 416 also detects a location where one or more hands of the character can attach to simulate grabbing of an object by the character during or after the jump. The grabbable object can be, for example, a pole hanging over a gap, a ledge or an edge at the other side of the gap. The markup detection module 416 creates an imaginary attach point and determines its location along a spline connecting marks in the simulated environment. When the user input indicating a jump is detected at the jump detection module 412, the attach point within the trajectory of the character may be identified based on the markers. The permissible range of grabbing operation may be set so that the attachment point is not generated if the character's trajectory is above a threshold distance from markers representing a grabbable object. In one or more embodiments, different types of grabbing (e.g., grabbing by a single hand or both hands) may be permitted depending on the markers of the grabbable object.

The animation selection module 424 determines whether predetermined conditions for using only blended animation clip without using inverse kinematics is satisfied. The predetermined conditions may indicate that the character can reach the other side of the gap without stretching one or more limbs of the character. The animation selection module 424 may determine that the predetermined conditions are met, for example, when a distance to the opposite side of the gap from a point of initiating the jumping is below a threshold, a height difference at both sides of the gap is less than another threshold, and a speed of the character is fast enough to jump across the gap. As another example, the predetermined conditions may be expressed in terms of an equation including the distance to the opposite side of the gap, the height difference at both sides of the gap, and the speed of the character. If these conditions are satisfied, then the character can jump over the gap without stretching any limbs. In such case, sufficiently realistic image frames may be generated using only blending of animation clips pre-stored in the animation clip storage 364 without performing any inverse kinematic operations. Hence, the animation selection module 424 may send jump selection signal 510 indicating the use of blended animation clip. In this way, the use of computing resources associated with simulating the jumping motions can be reduced.

Conversely, if the animation selection module 424 determines that the character's limb (e.g., arm) should be stretched to reach the opposite side of the gap, the animation module 424 generates the jump selection signal 510 to indicate the use of kinematics engine 522 so that motions of the character with one or more stretched limbs can be generated using the blending of animation clips followed by stretchy inverse kinematics.

In other embodiments, the predetermined conditions may be defined by presence of a marker indicative of an object where one or more hands of the character can attach. The presence or absence of such objects along the vicinity of the character's trajectory may force the use of the blending or inverse kinematics to generate the character's jumping motions. Various other predetermined conditions may be employed to balance the realistic jumping motion with the use of reduced computing resources.

Figure 5:
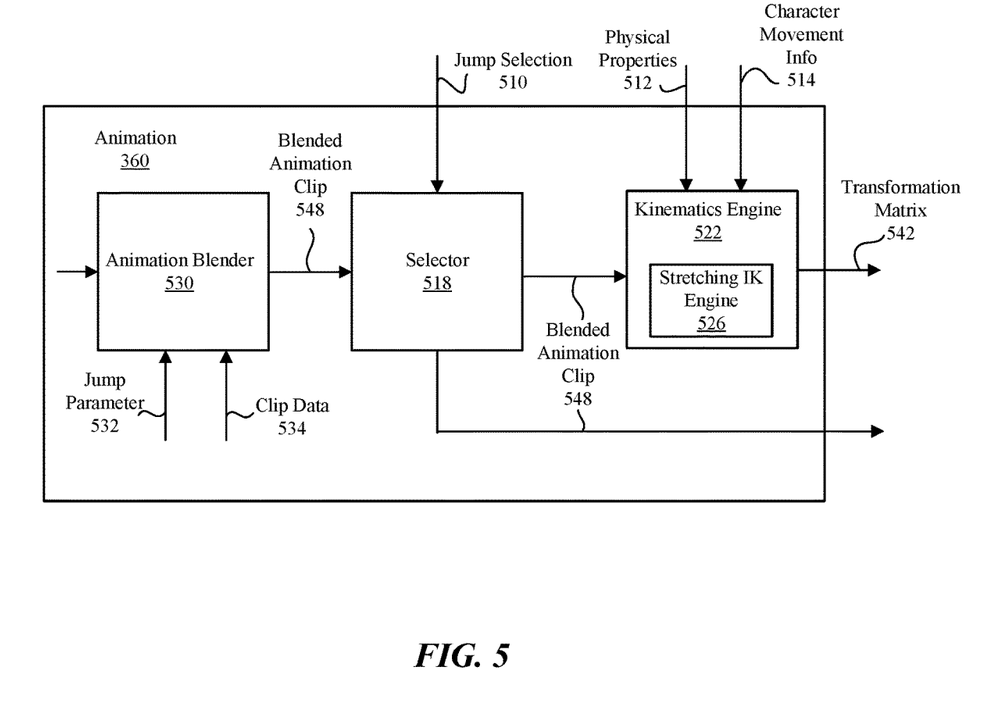
FIG. 5 is a block diagram of an animation module in the memory of FIG. 3, according to an embodiment.

The animation module 360 generates animation data in the form of transformation matrix 542 or blended animation clip 548 depending on the type of jump indicated in the jump selection signal 510. The blended animation clip 548 represent a series of poses of the character. For this purpose, the animation module 360 may include, among other components, selector module 518, kinematics engine 522, and animation blender module 530.

The selector module 518 receives the jump selection signal 510 from the operation module 312J and enables or disables the kinematics engine 522 (subsequent to the animation blender module 530) to generate the animation data of the character. If the kinematics engine 522 is disabled, the selector module 518 outputs blended animation clip 548 generated by the animation blender module 530 as the output of the animation module 360. If the kinematics engine 522 is enabled, the selector module 518 forward the blended animation clip 548 to the kinematics engine 522 to modify the character's poses as represented by the blended animation clip 548 to transformation matrix 542 representing update character's poses.

The kinematics engine 522 includes stretching inverse kinematic engine 526 that generates transformation matrix 542 for a character that has at least one stretchable body part. For this purpose, the kinematics engine 522 may include stretching inverse kinematics (IK) engine 526 as described, for example, in U.S. patent application Ser. No. 16/915,732, filed on Jun. 29, 2020 and entitled "Performing Simulation of Stretchable Character in Computer Game," which is incorporated by reference herein in its entirety. The kinematics engine 522 may receive physical properties 512 (e.g., a position, linear velocity, angular velocity, mass, inertia tensor and orientation of the character) from the physics system 330, character movement information 514 indicating constraints or features of poses and movements of the character, and the blended animation clip 548 from the animation blender module 530 via the selector 518. The transformation matrix 542 generated as a result of the processing at kinematics engine 522 is sent to the graphics rendering module 370 for further processing.

The animation blender module 530 receives jump parameter 532 from the operation module 312J, retrieves a subset of animation clip data from the animation clip storage 364, blends the retrieved animation clip data, and generates blended animation clip 548. The animation blender 530 may receive jump parameter 532 (e.g., the speed of the character when jumping) from the operation module 312J and identify indices of appropriate animation clips, and retrieves a subset of animation clips of the character from the animation clip storage 364 based on the identified indices. The animation blender 530 then blends the subset of animation clips by applying time-varying weights as determined from the jump parameters 532. The animation blender 530 may perform a method as well known in the art. The blended animation clip 548 generated as a result is sent to the graphics rendering module 370 for further processing. In one or more embodiments, the animation blender module 530 is part of a forward kinematics module.

Figure 6A:
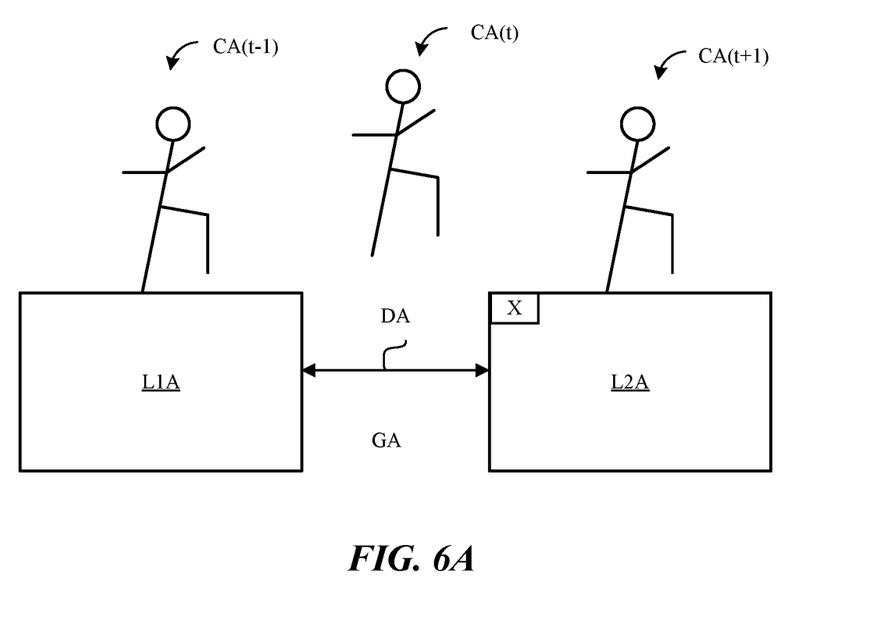
FIGS. 6A through 6E are conceptual diagrams illustrating various jumping motions of a character, according to embodiments.

FIGS. 6A through 6E are conceptual diagrams illustrating various jumping motions of characters, according to embodiments. FIG. 6A illustrates character CA at time (t−1) on a platform L1A, jumping over a gap GA at time (t) and landing on another platform L2A at time (t+1). The width DA of the gap GA is sufficiently small that the character can jump without using its stretching capabilities. Hence, the animation selection module 424 generates the jump selection signal 510 indicating that only the animation blender 530 be used without the kinematics engine 522 to generate a motion of the character jumping.

Figure 6B:
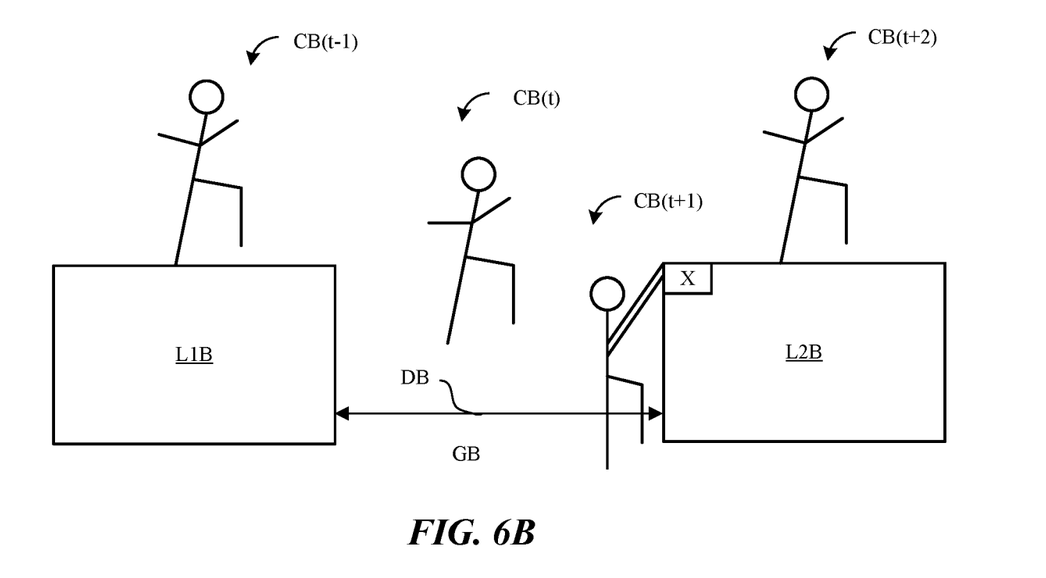

FIG. 6B also illustrates a scenario where character CB runs on platform L1B at time (t−1), jumps over a gap GB of width DB at time (t). But due to the wider width DB of gap GB, the character CB grabs the edge (or a ledge) of platform L2B at time (t+1) using both arms, pulls herself up and starts to walk or run on platform L2B at time (t+2). The edge or the ledge of platform L2B is marked (shown as X) as locations where the character's hand can attach. Hence, the markup detection module 416 identifies markers indicating the edge or the ledge at which character's hand or hands can attach during the jumping motion. The width or distance DB is detected by the markup detection module 416. Based on the distance from the character's jumping point on platform L1B to the edge or the ledge of platform L2B and speed/trajectory of the character, the animation selection module 424 determines that the character CB can grab onto the edge or the ledge without using stretching of the character's arms. Hence, the animation selection module 424 generates the jump selection signal 510 indicating that only the animation blender 530 be used without the kinematics engine 522 used to generate a motion of the character jumping.

Figure 6C:
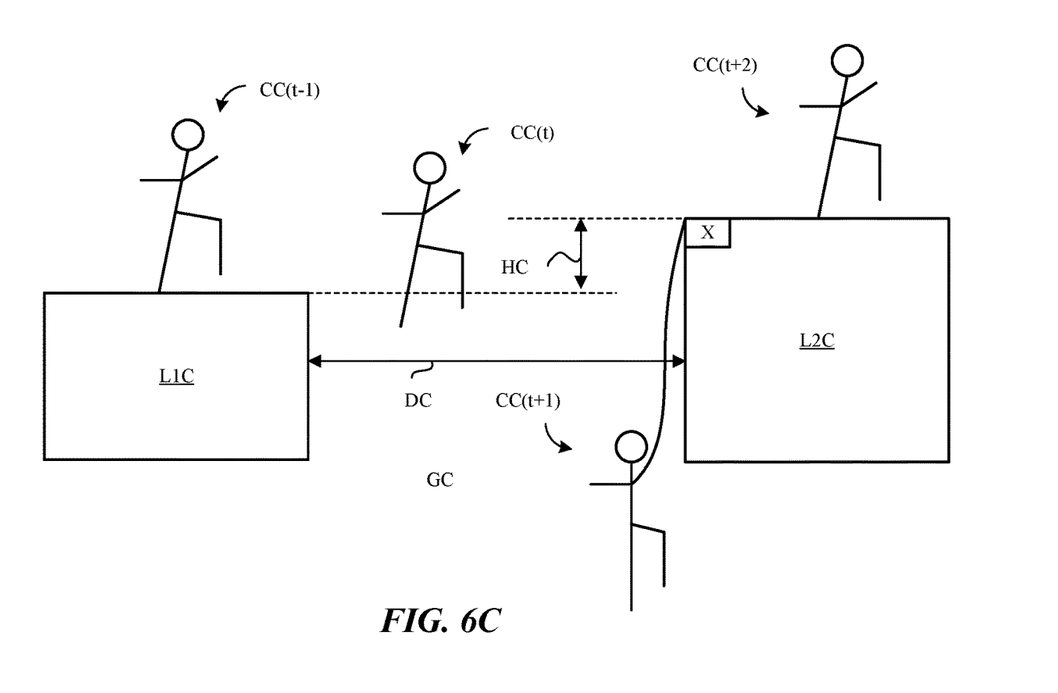

FIG. 6C illustrates a scenario where character CC jumps from platform L1C at time (t−1) but starts to drop into the gap GC of width DC at time (t) because the width DC and/or height different HC is large or the speed of the character CB is insufficient. The markup detection module 416 detects the width DC of the gap GD as well as the height difference HC, and sends the information to the animation selection module 424. The animation selection module 424 determines that the combination of the distance DC, height difference HC, the jumping on the platform L1C, and/or the speed of the character CC would allow the character CB to simulate grabbing the edge or ledge of platform L2C by attaching one or more hands of the character to locations marked with "X" when the character's arms are stretched at time (t+1). Hence, the animation selection module 424 generates the jump selection signal 510 to indicate that kinematic engine 522 is to be enabled to generate transformation matrix using stretchy inverse kinematics. After grabbing the edge or ledge and pulling herself out of the gap GC, the character CC walks or runs on platform L2C at time (t+2).

Figure 6D:
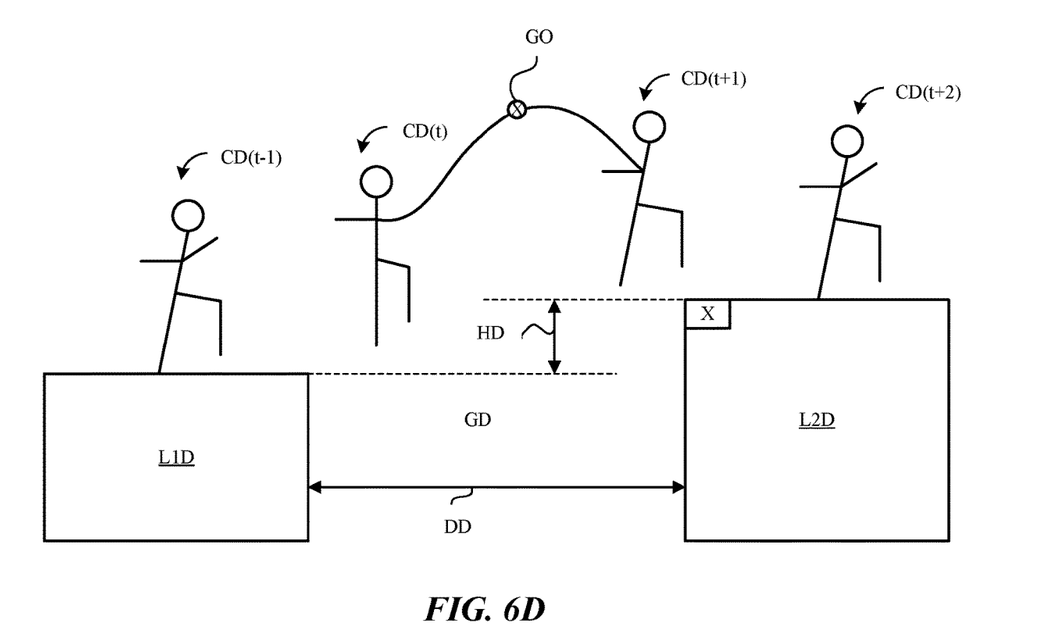

FIG. 6D illustrates a scenario where a character CD jumps from platform L1D at time (t−1) and grabs onto an object GO (e.g., a pole) at time (t) over a gap GD of width DD and height difference of HD. In this example, a user input may be received to grab the object GO after the character CD jumps from the platform L1D but the animation selection module 424 determines that the object GO is not reachable by the character CD unless her arm is stretched. Hence, the animation selection module 424 generates the jump selection signal 510 to indicate that the kinematic engine 522 is to be used in addition to the animation blender 530. The kinematic engine 522 generates poses of the character CD as the character stretches her arm and swings to the other side under the object GO at time (t+1) using stretchy inverse kinematics, taking into account the force applied to the character's body due to the grabbing of the object GO. Simultaneously, the physics system 330 determines the trajectory of the character's center of gravity based on physical parameters (e.g., velocity, mass, rotation) of the character. Hence, the kinematic engine 522 generates more realistic image frames showing a sequence of the character's poses during the jump, grab and release operations. After swinging under the object GO, the character lands on the platform L2D at time (t+2).

Figure 6E:
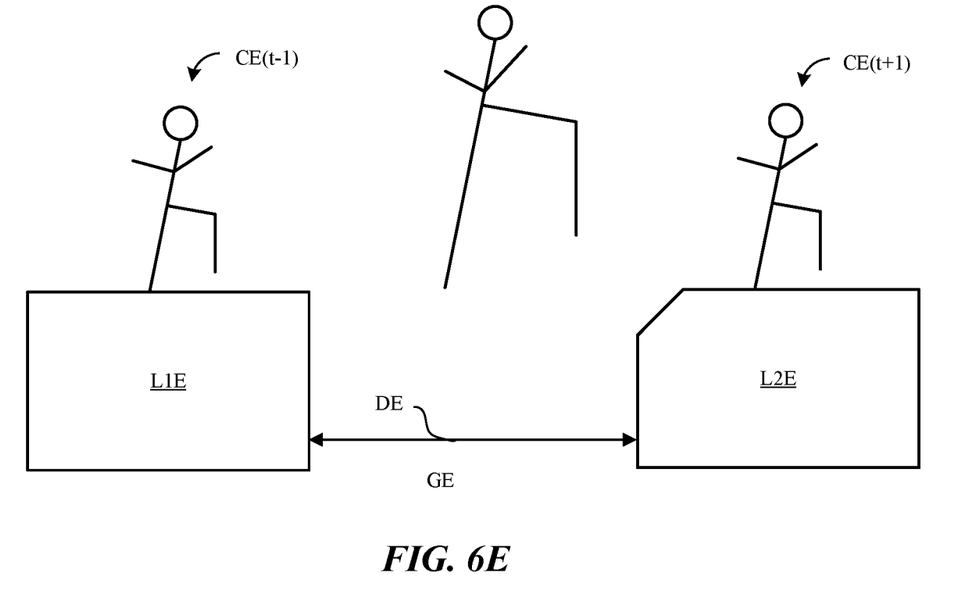

FIG. 6E illustrates a scenario where a character CE jumps from platform LE at time (t−1), stretches her legs at time (t) to jump over a gap GE of width DE and lands on platform L2E at time (t+1). Contrary to the scenarios of FIGS. 6A through 6D, the landing platform L2E does not have any locations with markers where the characters' hand or hands can attach but the distance DE is too far for the character CE to reach. In such case, the legs of the character CE may be stretched to accomplish a successful jump as shown in FIG. 6E. Such jumping motion may be generated either by blending animation clips stored in animation clip storage 364 or performing stretchy inverse kinematics so that the bones in the legs are extended. The stretching of legs may also be used in various other situations.

Contrary to the scenarios described above with reference to FIGS. 6A through 6E, if the operation module 312J (specifically, the animation selection module 424) determines that the character cannot make a successful jump, the animation selection module 424 may instruct the animation module 360 to replay a scene of the character falling through the gap.

Embodiments described above with reference to FIGS. 6A through 6E are merely illustrative. In one or more embodiments, a character may perform stretching of legs during the jump in the scenarios of FIGS. 6B through 6E while grabbing to a grabbable object only when further user inputs are received. Moreover, both the arms and legs of the character may be extended when jumping over a gap that is wider than a threshold level while extending only legs when the gap is narrower than the threshold. The selection between the use of blended animation clips and the use of inverse kinematics may be determined based on criteria that produces realistic motions, as needed, to reduce the computation resources used to simulate the jumping motions.

Figure 7A:
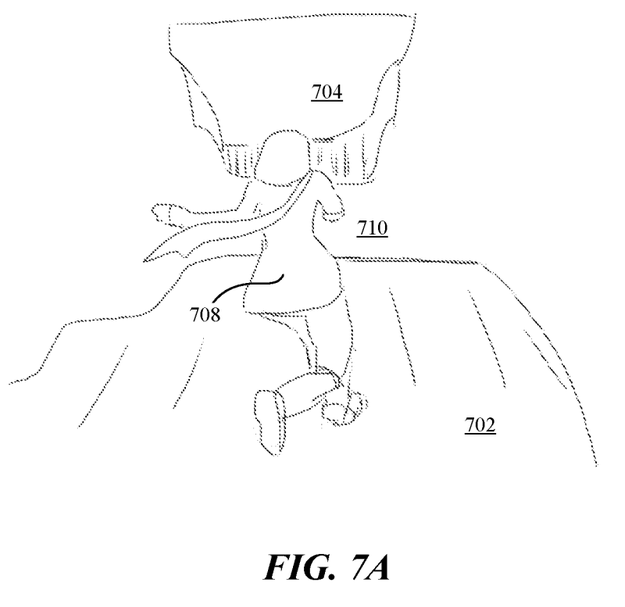
FIGS. 7A through 7C are diagrams illustrating series of motions of the character associated with the jumping motions, according to an embodiment.
Figure 7B:
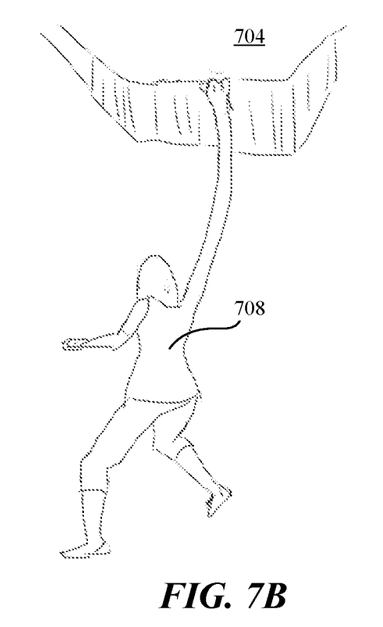
Figure 7C:
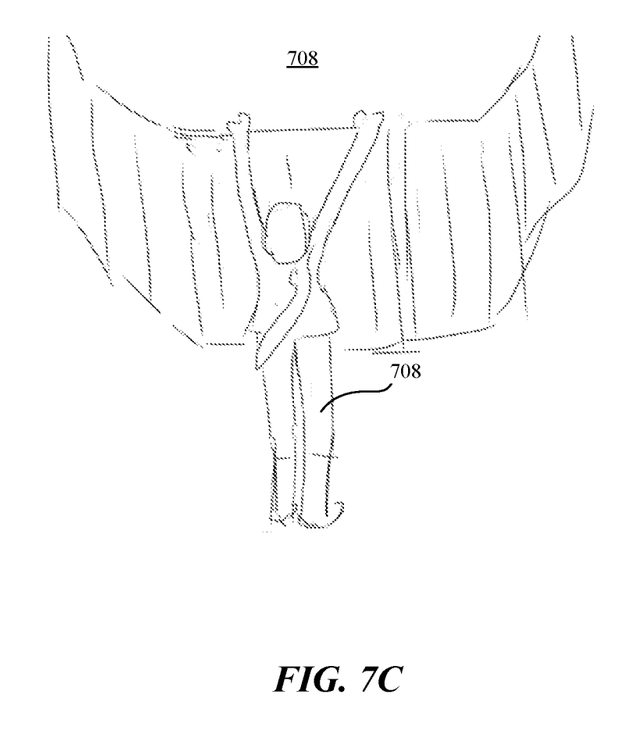

FIGS. 7A through 7C are diagrams illustrating image frames including a series of motions of the character associated with the jumping motions, according to an embodiment. FIG. 7A illustrates a character 708 running on platform 702 towards platform 704 that is separated by gap 710. FIG. 7B illustrates the same character 708 grabbing onto a ledge on the platform 704 as she drops into the gap 710. As shown in FIG. 7B, the character's arm is stretched using the blending of the animation clips and the stretchy inverse kinematics to increase the lengths of the bones in the arm.

FIG. 7C is a diagram where the gap 710 is sufficiently narrow such that the character can grab onto the ledge on the platform 704 without stretching her arm. A series of subsequent image frames includes the motion of the character generated by blending prestored animation clips without using the stretchy inverse kinematics.

Figure 8:
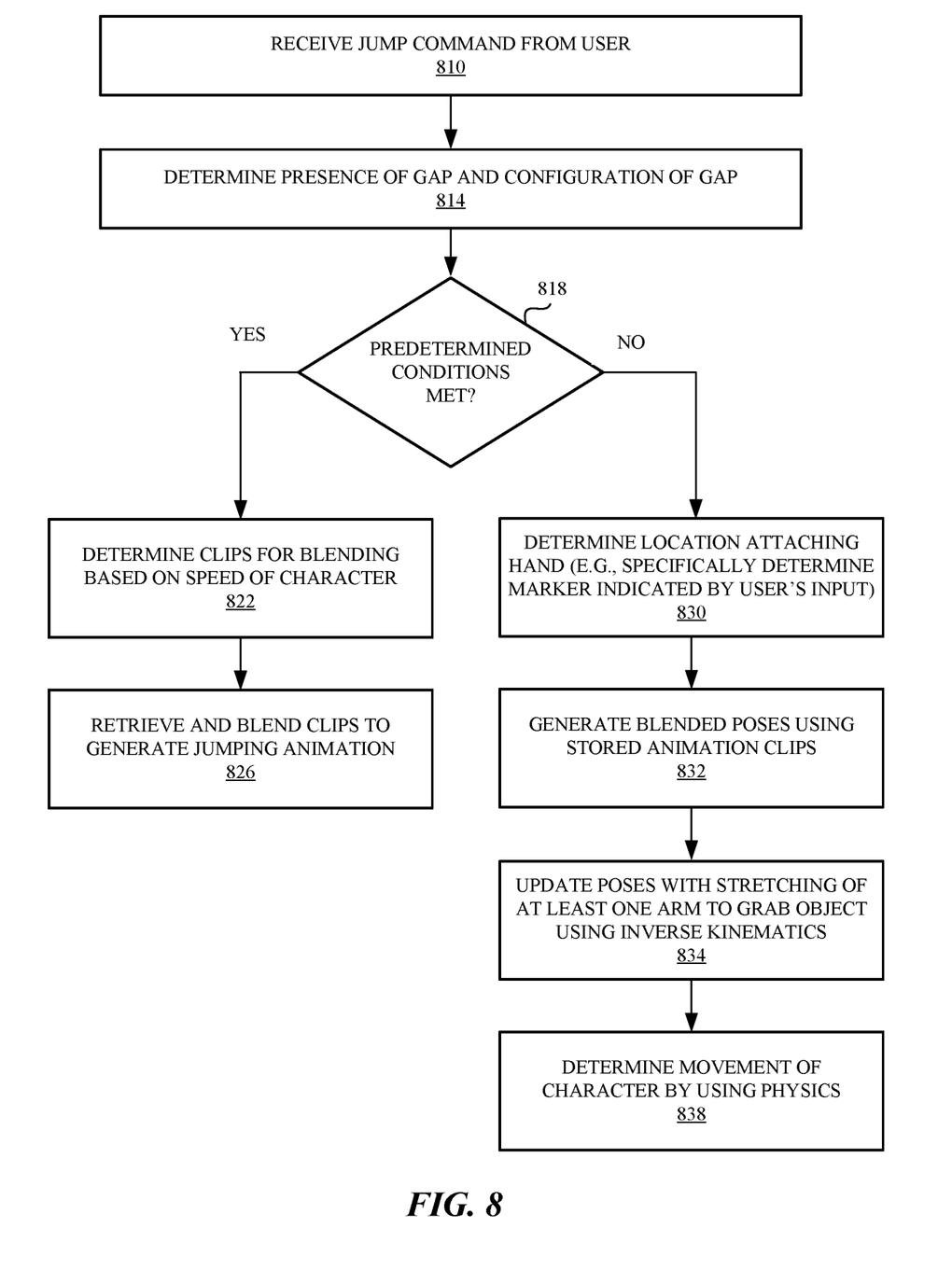
FIG. 8 is a flowchart illustrating a process of simulating a jumping motion of a character, according to one embodiment.

FIG. 8 is a flowchart illustrating a process of simulating a jumping motion of a character, according to one embodiment. A jump command is received 810 from a user instructing the character to jump over a gap. Such command is detected at the jump input detection module 412, as described above in detail with reference to FIG. 4.

The markup detection module 416 determines 814 whether a gap is present in the path of the character, and if so, it detects the configuration (e.g., width and height) of the gap. Based on the determination of the markup detection module 416, the animation selection module 424 determines 818 whether predetermined conditions are met. The predetermined conditions may, for example, be described as a function of a distance to the opposite side of the gap from a point of initiating the jumping, a height difference at both sides of the gap, and the speed of the character.

If the predetermine conditions are satisfied, then the jumping motion can be generated by blending prestored animation clips. Hence, animation clips for blending are determined 822, for example, based on the speed of the character at the time the character is initiating the jump. Then the animation blender 530 may retrieve and blend 826 the selected animation clips to generate a blended animation clip.

Conversely, if the predetermined conditions are not satisfied, then the presence of a location to which one or more hands of the character can attach (e.g., pole, ledge or edge) is determined 830 by the markup detection module 416. Such determination may be made, for example, by detecting markers indicative of objects or locations where the character's hand can attach in the vicinity of the trajectory of the character during her jumping motion.

Blended poses of the character are generated 832 by blending stored animation clips. Then the blended poses are updated 884 using stretchy inverse kinematics to generate poses of the character during the jump. The character's poses indicate stretching at least one arm of the character to the grabbable object during the jump. Moreover, the movement of the character is determined 838 using physics.

The processes, steps and their sequences illustrated in FIG. 8 are merely illustrative and various modifications can be made to the process. For example, the generating 834 of poses may be performed in parallel with the determining 838 of the movement of character or be reversed in order.

Although above embodiments are described primarily with the predetermined conditions related to determining whether a stretchable character may reach the opposite side of the gap by jumping, other conditions may also be used to determine whether image frames including the character may be generated by blending images or performing inverse kinematics. For example, if the size of the character shown in the scene may be used as alternative or additional factors for determining whether to generate the image frames through blending or inverse kinematics. Also, the processing capacity of the client devices 140 may also be taken into account to determine how the image frames are to be generated. For example, a client device is low processing capabilities may use blending more widely while sparingly using the inverse kinematics in limited circumstances.

Further, although the above embodiments are described with reference to the motions associated with jumping over a gap, the same principle may be applied to other motions such as jumping onto a wall.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A computer-implemented method for simulating a jumping motion of a character in a computer game, comprising:
   determining whether predetermined conditions associated with jumping of a character over a gap is satisfied;
   responsive to satisfying the predetermined conditions, generating a first series of image frames including a first jumping motion of the character over the gap based on prestored animation data of the character without performing inverse kinematics that simulate stretching of at least one bone in a limb of the character; and
   responsive to not satisfying the predetermined conditions, generating a second series of image frames including a second jumping motion of the character over the gap by at least performing the inverse kinematics that simulate the stretching of the at least one bone in a limb of the character.

2. The method of claim 1, wherein the predetermined conditions are associated with one or more of (i) a distance to the opposite side of the gap from a point of initiating the jumping, (ii) a height difference at both sides of the gap, and (iii) a speed of the character when the character is performing the jumping, and satisfying the predetermined conditions indicates that the character reaches an opposite side of the gap without stretching one or more limbs of the character.

3. The method of claim 1, wherein performing the inverse kinematics comprises determining a pose the character by changing a length of at least one bone in the limb of the character.

4. The method of claim 3, further comprising determining poses of the character and a trajectory of the character during the jumping motion by simulating motions of the character according to physical properties of the character including at least one of a position, linear velocity, angular velocity, mass, inertia tensor and orientation of the character.

5. The method of claim 4, wherein the character's hand attaches to a location during the jumping before landing on the other side of the gap, and wherein the simulating the motions of the character is further based on the inverse kinematics and a force applied to the character by the attached object.

6. The method of claim 5, further comprising determining the location based on one or more markers in a simulated environment responsive to receiving a user command indicating a grabbing or jumping action.

7. The method of claim 1, wherein the first series of image frames are generated by blending a subset of prestored animation clips of the character.

8. The method of claim 7, wherein the subset of prestored animation clips is selected based on a speed of the character when the character is performing the jumping.

9. The method of claim 1, further comprising receiving a command from a user to initiate the jumping before generating the first series of image frames or the second series of image frames.

10. The method of claim 1, wherein the first series of image frames include the character grabbing a wall or a ledge at the other side of the gap using both arms of the character, and wherein the second series of image frames include the character grabbing an object placed between the one side of the gap and the other side of the gap using a single arm or grabbing the wall or the ledge at the other side of the gap using the single arm.

11. A non-transitory computer-readable storage medium storing instructions thereon, the instructions when executed by one or more processors cause the one or more processors to:
   determine whether predetermined conditions associated with jumping of a character over a gap is satisfied;
   responsive to satisfying the predetermined conditions, generate a first series of image frames including a first jumping motion of the character over the gap based on prestored animation data of the character without performing inverse kinematics that simulate stretching of at least one bone in a limb of the character; and
   responsive to not satisfying the predetermined conditions, generate a second series of image frames including a second jumping motion of the character over the gap by at least performing the inverse kinematics that simulate the stretching of the at least one bone in a limb of the character.

12. The computer-readable storage medium of claim 11, wherein the predetermined conditions are associated with one or more of (i) a distance to the opposite side of the gap from a point of initiating the jumping, (ii) a height difference at both sides of the gap, and (iii) a speed of the character when the character is performing the jumping, and satisfying the predetermined conditions indicates that the character reaches an opposite side of the gap without stretching one or more limbs of the character.

13. The computer-readable storage medium of claim 11, further instructions to perform the inverse kinematics comprise instructions to determine a pose the character by changing a length of the at least one bone in the limb of the character.

14. The computer-readable storage medium of claim 13, further comprising instructions that cause the one or more processors to:
   determine poses of the character and a trajectory of the character during the jumping by simulating motions of the character according to physical properties of the character including at least one of a position, linear velocity, angular velocity, mass, inertia tensor and orientation of the character.

15. The computer-readable storage medium of claim 14, wherein the character's hand attaches to a location during the jumping before landing on the other side of the gap, and wherein the simulating the motions of the character is further based on a force applied to the character by the attached object and the inverse kinematics.

16. The computer-readable storage medium of claim 15, further comprising instructions that cause the one or more processors to determine the location based on one or more markers in in a simulated environment responsive to receiving a user command indicating grabbing or jumping operation.

17. The computer-readable storage medium of claim 11, wherein the first series of image frames are generated by blending a subset of prestored animation clips of the character, wherein the subset of prestored animation clips is selected based on a speed of the character when the character is performing the jumping motion.

18. The computer-readable storage medium of claim 11, wherein instructions cause the one or more processors to receive a command from a user to initiate the jumping motion before generating the first series of image frames or the second series of image frames.

19. The computer-readable storage medium of claim 10, wherein the first series of image frames include the character grabbing a wall or a ledge at the other side of the gap using both arms of the character, and wherein the second series of image frames include the character grabbing an object placed between the one side of the gap and the other side of the gap using a single arm or grabbing the wall or the ledge at the other side of the gap using the single arm.

20. A non-transitory computer-readable storage medium storing image frames generated by:
  determining whether predetermined conditions associated with jumping of a character over a gap is satisfied;
  responsive to satisfying the predetermined conditions, generating a first series of image frames including a first jumping motion of the character over the gap based on prestored animation data of the character without performing inverse kinematics that simulate stretching of at least one bone in a limb of the character; and
  responsive to not satisfying the predetermined conditions, generating a second series of image frames including a second jumping motion of the character over the gap by at least performing the inverse kinematics that simulate the stretching of the at least one bone in a limb of the character.

* * * * *